US011557801B2

United States Patent
Behlen et al.

(10) Patent No.: US 11,557,801 B2
(45) Date of Patent: Jan. 17, 2023

(54) TEMPERATURE CONTROL DEVICE FOR TEMPERATURE CONTROL OF A BATTERY SYSTEM, BATTERY SYSTEM AND METHOD FOR TEMPERATURE CONTROL AND/OR EXTINGUISHING OF A BATTERY SYSTEM

(71) Applicant: LION Smart GmbH, Garching (DE)

(72) Inventors: Christian Behlen, Munich (DE); Tobias Mayer, Munich (DE); Daniel Quinger, Herrsching (DE)

(73) Assignee: Lion Smart GmbH, Garching (DE)

( * ) Notice: Subject to any disclaimer, the term of this patent is extended or adjusted under 35 U.S.C. 154(b) by 283 days.

(21) Appl. No.: 16/633,978

(22) PCT Filed: Jul. 24, 2018

(86) PCT No.: PCT/EP2018/070059
§ 371 (c)(1),
(2) Date: Jan. 24, 2020

(87) PCT Pub. No.: WO2019/020639
PCT Pub. Date: Jan. 31, 2019

(65) Prior Publication Data
US 2020/0220237 A1     Jul. 9, 2020

(30) Foreign Application Priority Data
Jul. 27, 2017   (DE) .................... 10 2017 116 981.4

(51) Int. Cl.
*H01M 10/63* (2014.01)
*H01M 10/6568* (2014.01)
(Continued)

(52) U.S. Cl.
CPC ............... *H01M 10/63* (2015.04); *A62C 3/16* (2013.01); *H01M 10/486* (2013.01);
(Continued)

(58) Field of Classification Search
CPC . H01M 10/63; H01M 10/6568; H01M 10/486
See application file for complete search history.

(56) References Cited

U.S. PATENT DOCUMENTS

2013/0140001 A1   6/2013  Mandl
2016/0129754 A1*  5/2016  Rapp ................. B60H 1/00278
                                                       903/903

FOREIGN PATENT DOCUMENTS

CN     106356584 A      1/2017
DE   102008035216 A1   10/2009
(Continued)

OTHER PUBLICATIONS

International Search Report dated Oct. 23, 2018 from corresponding International Patent Application No. PCT/EP2018/070341, with English translation, 4 pages.
(Continued)

*Primary Examiner* — Olatunji A Godo
(74) *Attorney, Agent, or Firm* — Ruggiero McAllister & McMahon LLC

(57) ABSTRACT

A temperature control device for temperature control of a battery system has at least one battery subsystem. The temperature control device has a temperature control line for conducting a temperature control fluid and a pump device for generating a flow of the temperature control fluid in the temperature control line at least in a first flow direction. The temperature control line has at least one temperature control section which can be thermally conductively connected to the at least one battery subsystem for supplying and/or discharging thermal energy to or from the battery subsystem.

14 Claims, 2 Drawing Sheets

(51) Int. Cl.
  *A62C 3/16* (2006.01)
  *H01M 10/48* (2006.01)
  *B60L 58/26* (2019.01)
  *B60L 3/00* (2019.01)

(52) U.S. Cl.
  CPC ....... *H01M 10/6568* (2015.04); *B60L 3/0046* (2013.01); *B60L 58/26* (2019.02); *B60L 2240/545* (2013.01); *H01M 2200/10* (2013.01)

(56) References Cited

FOREIGN PATENT DOCUMENTS

| | | | |
|---|---|---|---|
| DE | 10 2009 000 709 A1 | 8/2010 | |
| DE | 10 2012 018 051 A1 | 3/2014 | |
| DE | 102013018414 A1 | 8/2014 | |
| DE | 10 2013 018 408 A1 | 5/2015 | |
| DE | 10 2014 204 263 A1 | 9/2015 | |
| DE | 10 2015 212 334 A1 | 1/2017 | |
| DE | 102015212334 | * | 1/2017 |
| DE | 102015212334 A1 | 1/2017 | |
| JP | 2013-62207 A | 4/2013 | |
| WO | 2011/149404 A1 | 12/2011 | |

OTHER PUBLICATIONS

Written Opinion dated Oct. 23, 2018 from corresponding International Patent Application No. PCT/EP2018/070341, 6 pages.
German Examination Report dated May 8, 2018 from corresponding German Patent Application No. 10 2017 116 981.4, 6 pages.
German Examination Report dated Sep. 14, 2021 from corresponding German Patent Application No. 10 2017 116 981.4, 6 pages.
Japanese Office Action dated Aug. 16, 2022 from corresponding Japanese Patent Application No. 2020-503729, 8 pages.

* cited by examiner

TEMPERATURE CONTROL DEVICE FOR TEMPERATURE CONTROL OF A BATTERY SYSTEM, BATTERY SYSTEM AND METHOD FOR TEMPERATURE CONTROL AND/OR EXTINGUISHING OF A BATTERY SYSTEM

CROSS-REFERENCE TO RELATED APPLICATION

This application is a national stage application, filed under 35 U.S.C. § 371, of International Patent Application No. PCT/EP2018/070059, filed on Jul. 24, 2018, which claims priority to German Patent Application 102017116981.4, filed on Jul. 27, 2017, the entire contents of each of which is incorporated by reference herein in its entirety.

BACKGROUND OF THE DISCLOSURE

1. Field of the Disclosure

The invention relates to a temperature control device for a temperature control of a battery system having at least one battery subsystem, the temperature control device having a temperature control line for conducting a temperature control fluid and a pump device for generating a flow of the temperature control fluid in the temperature control line at least in a first flow direction, the temperature control line having at least one temperature control section which can be thermally conductively connected to the at least one battery subsystem for supplying and/or discharging thermal energy to or from the battery subsystem. Further, the invention relates to a battery system comprising at least a battery subsystem and a temperature control device and a method for temperature control and/or extinguishing such a battery system, wherein for temperature control of the battery system the pump device generates a flow of the temperature control fluid in the temperature control line in the first flow direction.

2. Description of Related Art

Electric energy storage devices are widely used in modern technology, for example in electric vehicles. Possible forms of such energy storage systems are, for example, lithium-ion batteries. In order to increase the performance of such batteries, it is known, for example, that several individual battery subsystems can be electrically connected in parallel at one battery level. To achieve a further increase, two or more of these battery levels can be connected in series to form a battery stack. In particular, the individual battery levels can be arranged on top of each other and electrically connected.

During the operation of a battery system, heat generation is usually not negligible. However, a too low temperature of the battery system is also a hindrance to effective operation of a battery system. Temperature control of the battery system, in particular of the individual battery subsystems of the battery system, is therefore usually unavoidable. Thermal damage to the battery subsystems or the entire battery system can be avoided by the presence of temperature control devices. Well-known temperature control devices often have a temperature control line in which a temperature control fluid flows, usually driven by a pump device. By means of a thermally conductive connection between the temperature control line, for example a temperature control section of the temperature control line, and the individual battery subsystems of a battery system, thermal energy, in other words waste heat from the battery subsystems, can be absorbed by the temperature control fluid and transported away from the battery subsystems, or can be transported through the temperature control fluid to the battery subsystems and transferred to them.

Furthermore, even battery systems cannot completely prevent the occurrence of fire and/or fires, especially in the event of extreme external influences, such as those which may occur, for example, when a battery system is used in a vehicle in the event of an accident involving that vehicle. In order to avoid unnecessary damage to the battery system and, in particular, to avoid endangering the surroundings of the battery system by such a fire, it is advisable to extinguish such a fire as quickly as possible. In accordance with the state of the art, it is therefore known to use additional extinguishing devices in battery systems which ensure rapid extinguishing of the fire in the event of a fire. However, the disadvantage here is that these additional extinguishing devices also require additional installation space, so that the battery system can be less compact overall. Such additional extinguishing devices are also often complex and in particular cost-intensive.

SUMMARY

It is therefore the object of the present invention to remedy at least in part the disadvantages described above. In particular, it is the object of the present invention to provide, in a cost-effective and simple manner, a temperature control device, a battery system and a method for temperature control and/or extinguishing a battery system, by means of which, in addition to temperature control of the battery system, a simplified extinguishing of any fire or fires which may occur in the battery system can also be provided, in particular existing components of the temperature control device also be used for extinguishing fire or fires within the battery system.

The preceding object is solved by a temperature control device with the features of the independent claim 1, by a battery system with the features of the independent claim 11, and by a method for temperature control and/or extinguishing of a battery system with the features of the independent claim 12. Further features and details of the invention result from the dependent claims, the description and the drawings. Features and details which are described in connection with the temperature control device according to the invention also apply, of course, in connection with the battery system according to the invention as well as the method according to the invention and vice versa in each case, so that with regard to the disclosure of the individual aspects of the invention, mutual reference is or can always be made.

According to a first aspect of the invention, the object is solved by a temperature control device for temperature control of a battery system having at least one battery subsystem, the temperature control device comprising a temperature control line for conducting a temperature control fluid and a pump device for generating a flow of the temperature control fluid in the temperature control fluid line at least in a first flow direction, wherein the temperature control line comprises at least one temperature control section which can be thermally conductively connected to the at least one battery subsystem for supplying and/or releasing heat energy to or from the battery subsystem, wherein the temperature control line comprises at least one temperature control section which can be thermally conductively connected to the at least one battery subsystem for supplying and/or discharging heat energy to or from the battery subsystem. A temperature control device according to the invention is characterized in that a check valve is arranged in the temperature control line with respect to the first flow direction in front of the at least one temperature control section, the check valve being continuous for the temperature control fluid in the first flow direction and blocking in a second flow direction, the second flow direction being opposite to the first flow direction.

A temperature control device according to the invention is configured to control the temperature of a battery system. Temperature control in the sense of the invention means in particular a controlled change of a temperature of the battery subsystem by the temperature control device, both heating and cooling. Subcooling as well as overheating of the battery subsystem and thus of the entire battery system can be avoided. The battery system has at least one battery subsystem and may preferably have several battery subsystems, in particular arranged in several battery levels. A battery subsystem in the sense of the invention is understood to be a single battery cell in particular, but also a group of battery cells. The temperature control device is preferably configured to control the temperature of each of the battery subsystems. For each of the temperature controlled battery subsystems, in particular for a battery subsystem, the temperature control device has a temperature control section which can be thermally conductively connected to the respective battery subsystem. A pump device of the temperature control device generates a flow of a temperature control fluid in the temperature control line, whereby the temperature control fluid flows through the temperature control line and in particular through the temperature control section. The temperature control fluid can be present as a gas, a liquid and/or in a mixed state. In this way, heat energy can be absorbed by the temperature control fluid in the temperature conduction from the respective battery subsystems and transported away from them or transported to and released from them. The temperature control device may also have other components, such as an expansion tank, a temperature control fluid reservoir, a temperature control fluid heater, a radiator and/or a heat exchanger for delivering the thermal energy absorbed by the battery subsystems, in particular to the environment, for example.

According to the invention, it is provided that the temperature control device of the battery system can also be used to extinguish a fire or fires that occurs in the battery system. For this purpose, the temperature control device comprises a check valve which is arranged in the temperature control line with respect to the first flow direction in front of the at least one temperature control section. In other words, the check valve is arranged in the temperature control line in such a way that the temperature control fluid coming from the pump device first flows through the check valve and only then enters the at least one temperature control section. The check valve is continuous in this first flow direction, so that the check valve does not impair or at least only slightly impair a flow of the temperature control fluid driven by the pump device during normal or temperature control operation of the temperature control device. In a second flow direction opposite to the first flow direction, the check valve closes. This is used to provide the extinguishing functionality of the temperature control device according to the invention. If a fire or fires occurs inside a battery system, the local destruction of the temperature control line is usually caused by this fire. In this way, a so-called leakage point can occur in the temperature control line, for example. In addition, a fire in the battery system can be detected by the temperature control device, for example, by detecting a change in the temperature control fluid, for example a pressure in the temperature control fluid. Such a pressure change of the temperature control fluid can, for example, be detected by local evaporation of the temperature control fluid by the heat effect of the fire or by a pressure drop in the temperature control fluid which occurs when the temperature control fluid escapes through the leakage point described above. In the event of such a fire or fires, the pump device of the temperature control device can preferably adjust the pumping method in the first flow direction. In this case, a flow of the temperature control fluid in the second flow direction in the temperature control line is preferably generated, for example by an additional pump, by an appropriate control of the existing pump device, but also, for example, by a gravitational effect on the temperature control fluid. Due to the check valve described above, a flow of the temperature control fluid in the temperature control line in the second flow direction is basically obstructed, preferably even completely blocked. However, as also described above, there is usually a leakage point in the area of the fire, so that the temperature control fluid can escape there and in this way a flow of the temperature control fluid in the second flow direction is possible. In other words, in the event of a fire in the second flow direction, the temperature control fluid only flows to the location of the fire; all other possible flow paths within the temperature control line of the temperature control device are blocked by the check valve. By supplying temperature control fluid to the location of the fire, it can be extinguished or at least heat energy can be removed from this locally very large heat source. In this way, the occurring fire can be extinguished quickly and advantageously, but at least its thermal effects can be minimized by removing the heat energy. All in all, this can be provided by the already existing temperature control device, so that no additional extinguishing devices are necessary or the extinguishing devices which are nevertheless installed can at least be dimensioned considerably smaller. A battery system with such a temperature control device can thus in particular be planned and constructed more compactly.

Furthermore, it may be provided in a temperature control device according to the invention that the pump device for providing the temperature control fluid is configured at a leakage point, in particular generated by a fire, for generating a flow of the temperature control fluid in the temperature control line in the second flow direction. In this particularly preferred embodiment of a temperature control device according to the invention, the already existing pump device is used to provide a flow of the temperature control fluid in the temperature control line in the second flow direction. Additional pumps or the dependence on a gravitational supply of a flow of the temperature control fluid in the second flow direction can thus be avoided. An even more compact configuration of a temperature control device according to the invention and thus a battery system with such a temperature control device as well as an increase in safety when extinguishing a fire inside the battery system can thus be made possible.

According to a preferred embodiment, a temperature control device according to the invention may also provide that the temperature control line at the temperature control section and/or in the vicinity of the temperature control section has a safety section for controlled generation, in particular in the event of a fire with a leakage point. However, such a safety section can be provided or defined as a section on the battery system's temperature control line that is highly likely to leak in the event of a fire. Preferably this probability is 100% or at least only insignificantly less than 100%. In addition, each temperature control section of each battery subsystem shall preferably have such a safety section. In other words, such a safety section can at least very probably determine the position along the temperature control line where the leak occurs in the event of a fire. This allows the entire battery system to be laid out at this position of the leakage point, which in turn increases the overall safety when the battery system is operated.

A temperature control device in accordance with the invention may preferably be further developed in such a way that the safety section has a valve element, the valve element forming the leakage point by controlled opening when a limit temperature and/or a limit pressure, in particular of the temperature control fluid, is exceeded. Such a valve element represents a particularly safe possibility of generating the leakage point, which can be adjusted at least prior to operation of the battery system. Even a location of the leakage point can be configured to be even more precisely plannable with such a valve element. Uncontrolled occurrence of the leakage point, for example due to bursting of the temperature control line due to the effect of heat during a fire, can thus be avoided.

In accordance with a first alternative embodiment, an invention-based temperature control device can be further developed in such a way that the temperature control device has at least one sensor device for determining a temperature and/or a pressure and/or an evaporation of the temperature control fluid and a control unit for evaluating the sensor data determined by the sensor device and for controlling the valve element for opening the valve element when the limit temperature and/or the limit pressure is exceeded. In this first alternative embodiment, the generation of the leakage point thus includes a measurement of the properties of the temperature control fluid, an evaluation of these properties and a thus controlled opening of the valve device. By measuring and evaluating the properties of the temperature control fluid, a detection of a fire and/or fires in particular can be provided. This has the particular advantage that the opening of the valve device can be precisely adjusted and/or regulated. In particular, a subsequent modification of triggering criteria for opening the valve device can also be provided in this way. In addition, the valve element can also be closed, especially if the limit temperature and/or limit pressure falls below the limit again. An especially fast resumption of regular operation of the battery system can be provided in this way.

In an alternative further development of a temperature control device in accordance with the invention, it may also be provided that the valve element is configured as a burst valve which forms the leakage point when the limit temperature and/or limit pressure of the temperature control fluid is exceeded by controlled bursting. In particular, a burst valve of this type ensures automatic opening of the valve element as soon as the limit temperature and/or the limit pressure of the temperature control fluid is exceeded. This represents a particularly simple and safe configuration of a temperature control device according to the invention, as no external control or actuation of the valve element is necessary to open the valve element when creating the leakage point. For example, this configuration can also ensure that the leakage point is generated, even if an evaluation of sensor data is no longer possible, for example due to an interruption in the power supply of a control unit.

Furthermore, in the case of a temperature control device according to the invention, it may be provided that both alternatives described above are used in parallel. For example, controlled opening and closing of a valve element can be provided for a lower temperature or pressure range, whereas an additional valve element configured as a burst valve opens at a higher temperature or pressure effect and thus ensures a sufficient size of the leakage point. The advantages of both alternative embodiments can thus also be used together.

A temperature control device according to the invention can also be configured in such a way that the temperature control line is filled with an electrically insulated temperature control fluid. In this way, it can be ensured that even if the temperature control fluid leaks from the leakage point in the event of a fire, there is no short circuit within the battery system caused by an electrically conductive connection between the open contacts of the battery system and the temperature control fluid. A security of the entire battery system can be increased thereby.

In addition, a temperature control device according to the invention may be configured such that the battery system comprises a plurality of battery subsystems, wherein the temperature control line for each of the battery subsystems comprises a temperature control branch each having a temperature control section for the respective battery subsystem, further wherein a check valve is arranged in each temperature control branch with respect to the first flow direction upstream of the respective temperature control section, the check valve being continuous in the first flow direction and blocking in the second flow direction. In other words, the temperature control line splits or branches into several temperature control branches, each of which has a temperature control section for temperature control of its own area within the battery system. In this particularly preferred embodiment of a temperature control device in accordance with the invention, each of the temperature control branches is also equipped separately with its own check valve. In this way, for example, it can be ensured that the entire blocking load with regard to the flow of the temperature control fluid in the second flow direction is distributed to many check valves. In this case, the individual check valves can be of smaller dimensions. All in all, this embodiment can provide a further increase in the safety of a battery system with a temperature control device according to the invention, as each of the battery subsystems has its own temperature control branch, which is separately protected with its own check valve.

In the case of a temperature control device according to the invention, it may also be provided that the temperature control line is part of a closed temperature control circuit. In this closed temperature control circuit, the temperature control fluid in particular is circulated and thus constantly reused. In this way, a particularly economical use of the temperature control fluid can be provided. A temperature control device configured in this way is therefore particularly simple due to the constant reuse of the temperature control fluid and is also configured to provide particularly effective temperature control of the battery system.

A temperature control device according to the invention can also preferably be configured in such a way that a pressure relief valve is arranged in the temperature control line. A pressure relief valve of this type makes it particularly easy to detect when vaporized temperature control fluid accumulates in the temperature control line and is generated locally by a fire, for example. It may be particularly preferred that this pressure relief valve is coupled with a sensor device for detecting a fire. In the event that the pressure in the temperature control line rises above a limit pressure, as can be the case, for example, with massive evaporation of the temperature control fluid in the event of a fire, the pressure relief valve opens and the sensor device can detect the fire particularly easily, quickly and reliably. In addition, a pressure relief valve of this type can ensure that damage to the temperature control line or the entire temperature control device caused by an excessive pressure of temperature control fluid in the temperature control line can be avoided.

According to a second aspect of the invention, the object is solved by a battery system comprising at least a battery subsystem and a temperature control device. A battery system according to the invention is characterized in that the temperature control device is configured according to the first aspect of the invention. All the advantages which have been described in detail in relation to a temperature control device in accordance with the first aspect of the invention can thus also be provided by a battery system in accordance with the second aspect of the invention which has such a temperature control device in accordance with the first aspect of the invention.

According to a third aspect of the invention, the object is solved by a method for temperature control and/or extinguishing a battery system according to the second aspect of the invention, whereby for temperature control of the battery system the pump device generates a flow of the tempering fluid in the temperature control line in the first flow direction. A method according to the invention is characterized by the following steps:
  a) detecting a fire inside the battery system; and
  b) controlling the pump device to generate a flow of the temperature control fluid in the second flow direction.

A method according to the invention is performed in a battery system according to the second aspect of the invention. A battery system according to the second aspect of the invention has in particular a temperature control device according to the first aspect of the invention. All the advantages which have been described in detail in relation to a battery system according to the second aspect of the invention and in particular in relation to a temperature control device according to the first aspect of the invention can thus also be provided by a method according to the third aspect of the invention.

A method according to the invention is configured for temperature control of a battery system. For this temperature control characteristic, the pump device of the temperature control device of the battery system is operated in such a way that the temperature control fluid in the temperature control line flows in the first flow direction. At least one temperature control section, preferably several temperature control sections, of the temperature control line are thermally conductively arranged on at least one or several battery subsystems of the battery system, so that waste heat can be removed from the battery subsystems or thermal energy can be supplied to the battery subsystems by the flow of the temperature control fluid. Temperature control of these battery subsystems, and thus of the entire battery system, can thus be provided.

Steps a) and b) of a method according to the invention are intended in particular for the case when a fire has occurred or is occurring in the battery system. Thus, in step a) of a method according to the invention, the fire inside the battery system is detected. This recognition can be performed, for example, by evaluating suitable sensor data using a control device. An external control of the temperature control device in the sense of a method according to the invention when the fire is detected by external sensors is also covered by a step a) of a method according to the invention. In the next step b) of a method according to the invention, in the presence of a fire, the pump device of the temperature control device is controlled in such a way that a flow of the temperature control fluid in the temperature control line is generated in the second flow direction. The second flow direction is opposite to the first flow direction used during the temperature control operation of the temperature control device. Due to the presence of at least one check valve in the temperature control line, a flow of the temperature control fluid in the temperature control line in the second flow direction is essentially blocked. The temperature control fluid can only flow out at points in the battery system where leakage points have occurred due to the fire. Thus, temperature control fluid is supplied exclusively to these leakage points, and thus locally to those positions in the battery system where fire is present. Extinguishing the fire or at least dissipating heat energy from the fire can be made particularly easy in this way by a method in accordance with the invention. Damage to the battery system caused by fire can thus be prevented or at least significantly reduced.

A method according to the invention may be further developed in such a way that in step a) a fire is detected by evaluating sensor data from a sensor device to determine a temperature and/or a pressure and/or an evaporation of the temperature control fluid. When a fire occurs in the battery system, the temperature control fluid is heated locally very strongly, especially significantly more than in normal temperature control operation. The heating of the temperature control fluid is often so strong that it is heated above its boiling point and thus evaporates. By determining a temperature and/or a pressure and/or an evaporation of the temperature control fluid a detection of a fire inside the battery system can be provided in a very simple way. Additional external sensors for fire detection can thus be dispensed with.

In addition, in the case of a method according to the invention, it may be provided that in step b) the pump device is controlled in such a way that temperature control fluid emerges from the leakage point. In this case, the temperature control fluid can be electrically insulating or non-conductive. It can be provided that the temperature control fluid is conducted directly into the fire or at least into the vicinity of the fire by the emerging temperature control fluid at the leakage point, wherein the leakage point in particular is preferably arranged at least in the vicinity of the fire in the battery system. In this way, extinguishing the fire can be provided particularly easily and particularly quickly. If it is not possible to extinguish the fire, at least a large proportion of the heat energy can be absorbed by the flowing temperature control fluid and transported away from the fire. Avoidable thermal damage to the battery system can thus be avoided.

Alternatively, in the case of a method according to the invention, it may be provided that in step b) the pump device is controlled in such a way that a level of temperature control fluid in the temperature control line at or at least in the vicinity of the leakage point remains constant or at least substantially constant. In other words, the pump device is controlled in such a way that at the leakage point only the temperature control fluid evaporated by the heat of the fire is compensated. A leakage of temperature control fluid from the leakage point is avoided in this embodiment of a method according to the invention. By ensuring a constant or at least in the western constant filling level at or at least in the vicinity of the leakage point, drying out of the temperature control line at the corresponding point can be avoided. Continuous replenishment of temperature control fluid by the pump device can also prevent excessive heat exposure to the affected battery subsystem. The temperature control fluid can only be heated up to its maximum boiling temperature and then evaporates, whereby the evaporated temperature control fluid emerges from the leakage point and the missing volume of temperature control fluid is constantly replaced by the pump device. Even in this version of a method according to the invention, too much thermal damage to the battery system caused by fire can be avoided.

BRIEF DESCRIPTION OF THE FIGURES

Further advantages, features and details of the invention result from the following description, in which embodiments of the invention are described in detail with reference to the drawings. The features mentioned in the claims and in the description may be essential to the invention either individually or in any combination. The explanation of the embodiments describes the present invention exclusively in the context of examples. Of course, individual features of the embodiment's forms can be freely combined with each other, if technically reasonable, without leaving the scope of the present invention. Elements with the same function and mode of action have the same reference signs in the figures. They show schematically:

DETAILED DESCRIPTION

Figure 1:
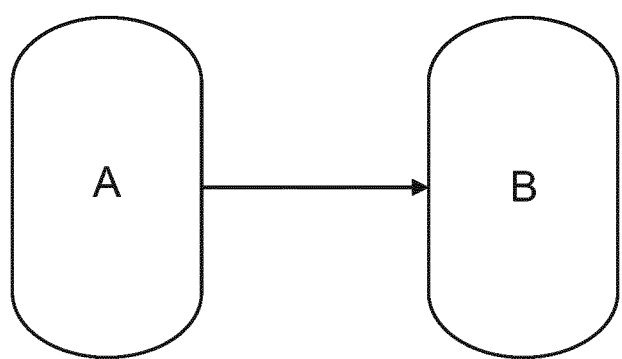
FIG. 1 a method according to the invention.
Figure 2:
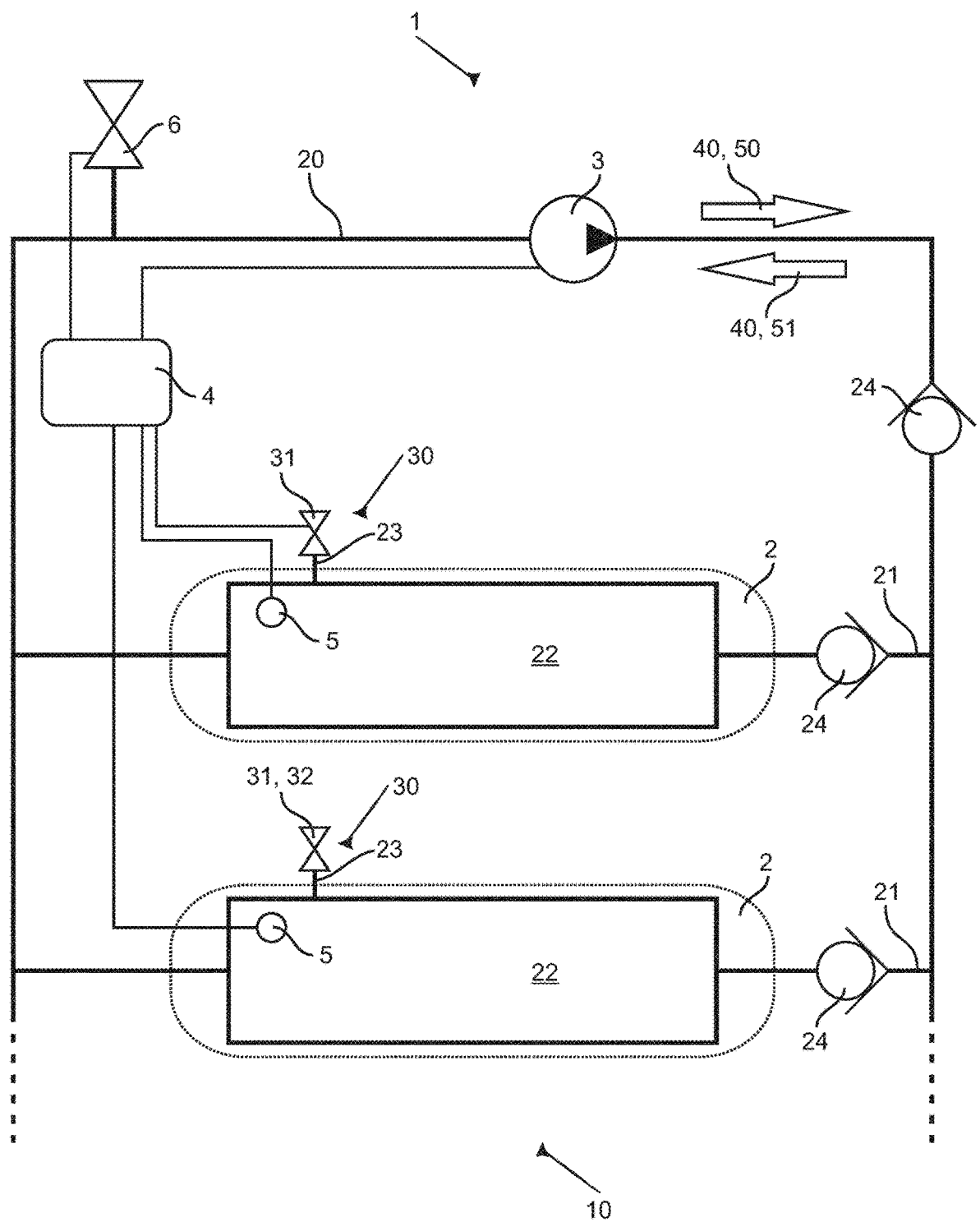
FIG. 2 a battery system according to the invention with a temperature control device according to the invention.

FIG. 1 schematically shows a method according to the invention. Steps a) and b) of a method according to the invention are designated by the letters A and B. A method according to the invention is performed by a battery system 1 according to the invention or by using a temperature control device 10 according to the invention, as shown in FIG. 2. The two figures will therefore be described together in the following, whereby the individual figures will be dealt with separately.

A battery system 1 according to the invention has at least one battery subsystem 2, whereby two battery subsystems 2 are shown in the embodiment of a battery system 1 according to the invention. Battery subsystems 2, for example, can be combined in battery levels, while the battery levels in turn can be piled up to form a battery stack of battery system 1. High performances of such a battery system 1 can thus be achieved, for example for use in a vehicle. Essentially, a temperature control device 10 according to the invention is configured for temperature control of the battery subsystems 2 of the battery system 1. For this purpose, the temperature control device 10 has a temperature control line 20 in which a temperature control fluid 40 is circulated in a first flow direction 50 by a pump device 3. The temperature control line 20 is preferably part of a closed temperature control circuit. The individual battery subsystems 2 are each assigned a temperature control section 22 of the temperature control line 20, whereby in this configuration the individual battery subsystems 2 are each supplied with temperature control fluid 40 by a temperature control branch 21 of the temperature control line 20. The temperature control sections 22 are thermally conductively connected to the respective battery subsystem 2, so that when the temperature control fluid 40 flows in the first flow direction 50 thermal energy can be transferred from the battery subsystem 2 to the temperature control fluid 40 and/or from the temperature control fluid 40 to the battery subsystem 2 when flowing past in the temperature control section 22. Effective temperature control of the battery subsystems 2 and thus of the entire battery system 1 can be provided in this way.

Essentially, at least one check valve 24 is arranged in the temperature control device 10 in the temperature control line 20 in accordance with the invention. The check valve 24 is arranged in such a way that it is located in front of the temperature control sections 22 in relation to the first flow direction 50. As shown, the check valve 24 can be arranged in a central section of the temperature control line 20, but also in each individual temperature control branch 21. When the temperature control fluid 40 flows in a first flow direction 50, as it is generated in normal or temperature control operation by the pump device 3, the check valves 24 are continuous. Flow of the temperature control fluid 40 in this first flow direction 50 is thus not or only insignificantly impeded by the check valves 24. The check valves 24 are used in particular when the invention temperature control device 10 is to be used to extinguish a fire inside the battery system 1. Such a fire may be detected in one step a) of a method according to the invention by, for example, sensor devices 5 located inside battery system 1, e.g. associated with each battery subsystem 2. It is also possible to monitor a pressure relief valve 6 by means of an appropriate sensor. In a control unit 4, the data of the sensor devices 5 are collected and evaluated and, for example, if a temperature threshold and/or a pressure threshold is exceeded, a fire is detected inside the battery system 1. Opening the pressure relief valve 6 can also indicate such a fire inside the battery system 1, since in particular such a fire can cause local evaporation of the temperature control fluid 40, which then rises in the temperature control line 20 until the pressure is so high that the pressure relief valve 6 opens. In the case of a detected fire, in step b) of a method according to the invention, the control unit 4 controls the pump device 3 in such a way that a pump direction of the pump device 3 is reversed. Thus, the temperature control fluid 40 is pumped in the second flow direction 51 through the temperature control lines 20. However, the check valves 24 block in this direction, so that essentially a flow of the temperature control fluid 40 in the second flow direction 51 is blocked. However, in this preferred configuration of a temperature control device 10 according to the invention, the temperature control sections 22 each have a safety section 23 which is configured to locally generate a leakage point 30 in the event of a fire. Two different types of leakage points 30 are shown, but they can also be used together. In the upper configuration, the safety section 23 has a valve element 31 which can be controlled by the control unit 4. When a fire is detected, for example by the corresponding sensor device 5, the valve element 31 is activated and opened so that a locally controlled leakage point 30 occurs in the temperature control line 20. The flow path of the temperature control fluid 40 in the second flow direction 51, which is otherwise blocked by the check valves 24, is thus opened locally by the corresponding leakage point 30. In this way, temperature control fluid 40 can be pumped through the pump device 3 in the second flow direction 51 in such a way that it flows out of the corresponding leakage point 30 and extinguishes the fire present there. Alternatively, it can also be provided that the pump device 3 is controlled in such a way that a filling level of the temperature control fluid 40 is kept constant or at least essentially constant at leakage point 30. Drying out and thus overheating of the corresponding battery component system 2 can also be avoided in this way. The figure below shows an alternative embodiment of a leakage point 30 of a temperature control device 10. According to the invention, in this embodiment, the valve element 31 is configured as a burst valve 32. This burst valve 32 opens automatically as soon as the temperature control fluid 40 exceeds a limit temperature and/or a limit pressure. Control by a control unit 4 is not necessary in this case. A burst valve 32 of this type is therefore a particularly fail-safe variant for generating a precisely localized leakage point 30. In both embodiment variants, it may be preferred that a temperature control fluid 40 which is electrically insulating is used in the temperature control device 10. A short circuit in battery system 1 caused by leaking temperature control fluid 40 can thus be safely prevented. In total, a temperature control device 10 according to invention in a battery system 1 according to the invention can provide for a defined flow or at least a leading of temperature control fluid 40 to a position of a fire inside the battery system 1 by reversing the pump device 3 and the local opening of the temperature control line 20 produced especially by the leakage point 30. Such a fire can therefore be quickly extinguished or at least its thermal effects minimized. Additional extinguishing devices can thus be avoided in particular by using a temperature control device 10 in accordance with the invention.

The invention claimed is:

1. A temperature control device for temperature control of a battery system having at least one battery subsystem, the temperature control device comprising:
    a temperature control line for conducting a temperature control fluid; and
    a pump device for generating a flow of the temperature control fluid in the temperature control line at least in a first flow direction,
    wherein the temperature control line has at least one temperature control section which can be thermally conductively connected to the at least one battery subsystem for supplying or discharging thermal energy to or from the battery subsystem,
    wherein the temperature control line comprises a check valve arranged upstream of the at least one temperature control section with respect to the first flow direction, the check valve being continuous for the temperature control fluid in the first flow direction and blocking in a second flow direction, the second flow direction being opposite to the first flow direction, and
    wherein the pump device is configured to provide the temperature control fluid at a leakage point that allows generating a flow of the temperature control fluid in the temperature control line in the second flow direction.

2. The temperature control device according to claim 1, wherein the temperature control line at least at the temperature control section or in a vicinity of the temperature control section has a safety section for controlled generation of the leakage point.

3. The temperature control device according to claim 2, wherein the safety section has a valve element, the valve element forming the leakage point by controlled opening when at least a limit temperature or a limit pressure, is exceeded by controlled opening.

4. The temperature control device according to claim 3, wherein the temperature control device has at least one sensor device for determining at least a temperature or a pressure or an evaporation of the temperature control fluid and a control unit for evaluating sensor data determined by the sensor device and for controlling the valve element for opening the valve element when at least the limit temperature or the limit pressure is exceeded.

5. The temperature control device according to claim 3, wherein the valve element is configured as a burst valve which forms the leakage point by controlled bursting when at least the limit temperature or a limit pressure of the temperature control fluid is exceeded.

6. The temperature control device according to claim 1, wherein the temperature control line is filled with an electrically insulating temperature control fluid.

7. The temperature control device according to claim 1, wherein the battery system has a plurality of battery subsystems, the temperature control line for each of the battery subsystems having a temperature control branch each with a temperature control section for the respective battery subsystem, and wherein the check valve is arranged in each temperature control branch with respect to the first flow direction, upstream of the respective temperature control section, the check valve in the first flow direction is continuous and blocks in a second flow direction.

8. The temperature control device according to claim 1, wherein the temperature control line is part of a closed temperature control circuit.

9. The temperature control device according to claim 1, further comprising a pressure relief valve arranged in the temperature control line.

10. A battery system having at least one battery subsystem and a temperature control device, wherein the temperature control device is configured for temperature control of the battery system, the battery system having at least one battery subsystem, the temperature control device comprising:
    a temperature control line for conducting a temperature control fluid; and
    a pump device for generating a flow of the temperature control fluid in the temperature control line at least in a first flow direction,
    wherein the temperature control line has at least one temperature control section that can be thermally, conductively connected to the at least one battery subsystem for supplying or discharging thermal energy to or from the battery subsystem,
    wherein the temperature control line comprises a check valve arranged upstream of the at least one temperature control section with respect to the first flow direction, the check valve being continuous for the temperature control fluid in the first flow direction and blocking in a second flow direction, the second flow direction being opposite to the first flow direction, and
    wherein the pump device is configured to provide the temperature control fluid at a leakage point that allows generating a flow of the temperature control fluid in the temperature control line in the second flow direction.

11. A method for temperature control and/or extinguishing a battery system according to claim 10, wherein for controlling the temperature of the battery system, the pump device generates a flow of the temperature control fluid in the temperature control line in the first flow direction, the method comprising the steps of:
    a) detecting a fire inside the battery system; and
    b) controlling the pump device to generate a flow of the temperature control fluid in the second flow direction.

12. The method according to claim 11, wherein in step a) a fire is recognized by an evaluation of sensor data of a sensor device for determining at least a temperature or a pressure or an evaporation of the temperature control fluid.

13. The method according to claim 11, wherein in step b) the pump device is actuated in such a way that temperature control fluid emerges from a leakage point.

14. The method according to claim 11, wherein in step b) the pump device is actuated in such a way that a filling level of temperature control fluid in the temperature control line at or at least in the vicinity of a leakage point remains constant or at least substantially constant.

\* \* \* \* \*